Dec. 2, 1969 — G. L. RAM — 3,481,513

METERING SAFETY CAP DEVICE

Filed March 6, 1968 — 2 Sheets-Sheet 1

INVENTOR
GERSON L. RAM

*Sommers & Sommers*
BY
ATTORNEYS

Dec. 2, 1969  G. L. RAM  3,481,513
METERING SAFETY CAP DEVICE
Filed March 6, 1968  2 Sheets-Sheet 2

INVENTOR
GERSON L. RAM

Sommers & Sommers
BY
ATTORNEYS

United States Patent Office 3,481,513
Patented Dec. 2, 1969

---

3,481,513
METERING SAFETY CAP DEVICE
Gerson L. Ram, 15 Briar Hill Road,
Cedar Grove, N.J. 07009
Filed Mar. 6, 1968, Ser. No. 711,003
Int. Cl. B65d 5/72
U.S. Cl. 222—490                                    3 Claims

ABSTRACT OF THE DISCLOSURE

A metering safety cap device for closing containers and safeguarding them against accidental or unauthorized dispensing of the contents thereof, by requiring a sequential, multi-step, timed and calculated procedure to be precisely followed, for dispensing of only measured quantities of the contents on completion of each step of a sequential timed dispensing procedure.

---

METERING SAFETY CAP DEVICE

Figure 1:
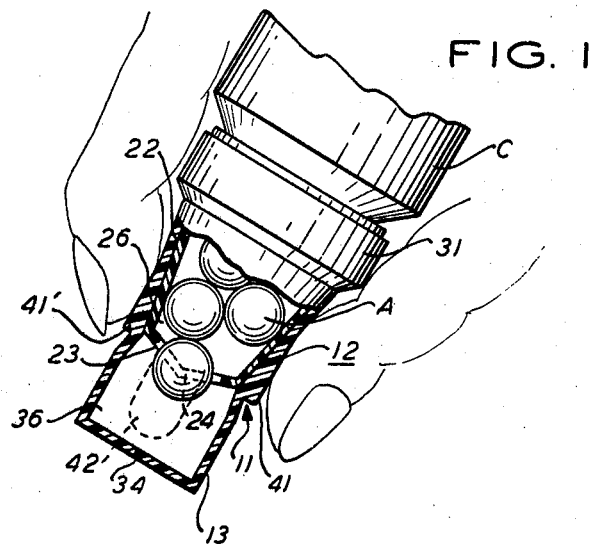

This invention relates to caps for containers, and more particularly to a metering safety cap device adapted to require a multi-step procedure, for dispensing of precalculated, tolerable quantities of the contents of the container, preventing accidental dispensing of large or excessive quantities or unauthorized dispensing of the contents of the container as, for example, by children.

Pursuant to the invention, the metering safety cap device may be readily fixed to a container and operated and utilized by an adult only on performing a series of timed sequential procedures. It is necessary, in order to perform the series of steps, that the operator have normal adult manual dexterity, strength and intelligence. Thus, for example, children will be unable to operate the device and will be unable to obtain harmful or poisonous dosages of the contents; the device will similarly prevent accidental or absentminded access to contents or overdosages by adults.

Devices heretofore proposed for this purpose have generally been objectionable due to their simplicity of operation, which permitted children and others to easily or accidentally operate the cap device and discharge the contents of the container.

With the tremendous increase in the use of medicaments and chemicals in the home, the lack of effective metering safety cap devices has led to a vast increase in the number of deaths and serious injuries resulting from the accidental ingestion of harmfull or poisonous dosages. These and other objections to devices heretofore proposed for the purpose have been overcome in the metering safety cap device of this invention.

In the drawings, wherein similar reference characters indicate like parts:

FIG. 1 is a side elevational, partly sectional view of a metering safety cap device embodying the invention, shown actuated in the first step in the dispensing operation.

Figure 2:
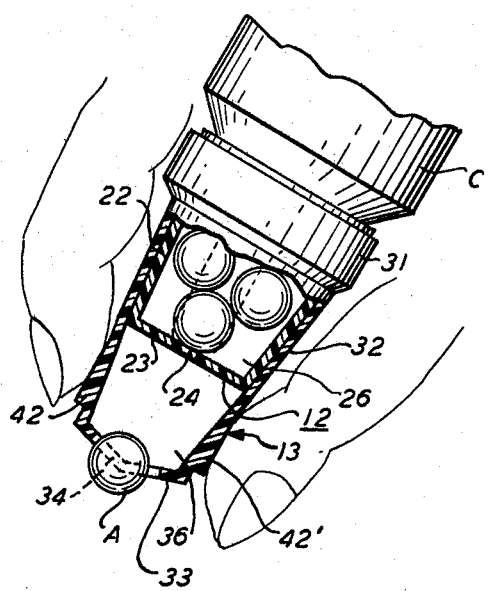
Figure 3:
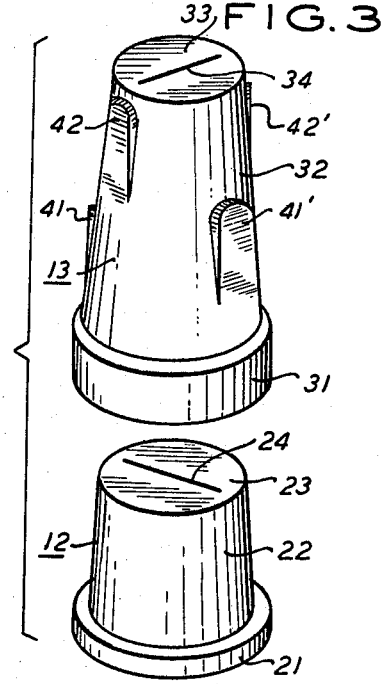
Figure 4:
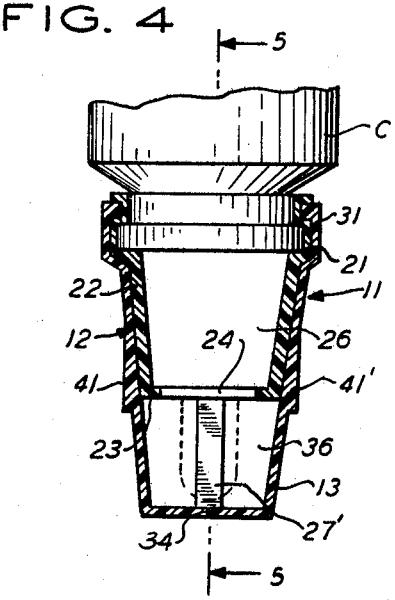
Figure 5:
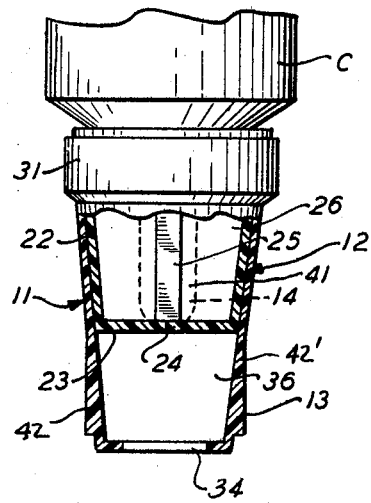
Figure 6:
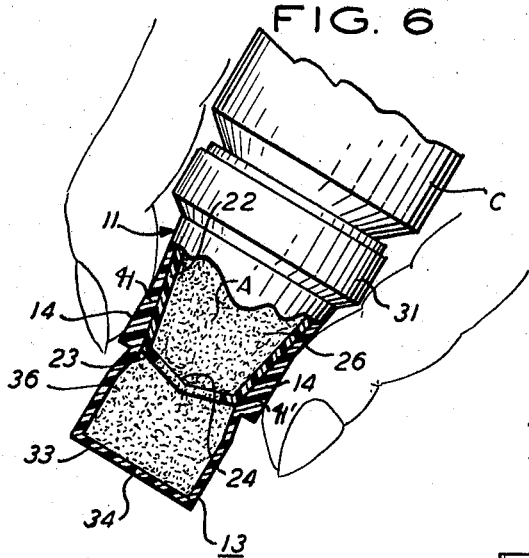
Figure 7:
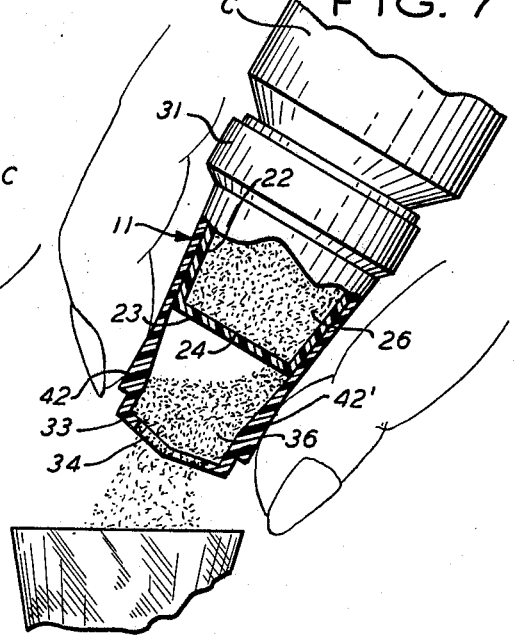

FIG. 2 is a similar view, showing the device actuated in the second step of the dispensing operation, FIG. 3 is a side elevational, exploded view of part of the metering safety cap device embodying the invention, FIG. 4 is a side elevational partly sectional view of an assembled metering safety cap device embodying the invention, FIG. 5 is a similar view, at line 5—5 of FIG. 4, FIG. 6 is a similar view, showing the first step in dispensing a bulk product pursuant to the invention, and FIG. 7 is a similar view showing the second step in the dispensing of bulk products pursuant to the invention.

This invention relates to a metering safety cap device, operated, as will be described below, with reference generally to FIGS. 1 and 2, so that the contents A (such as solids, powders, pills, capsules, liquids, tablets, crystalline substances etc.) will be dispensed, pursuant to the invention, in a multi-step operation, from closure section C of the container first into intermediate or isolating chamber 36, on application of simultaneous pressure against pads 41, 41' (FIG. 1) on the surface of the metering cap. In the second operation, pressure is applied to another offset series of pressure pads (42, 42') on the surface of the metering cap. The performance of these various steps requires coordination, manual dexterity, strength and intelligence of an adult, thus preventing a child from so operatiing the device.

The metering safety cap device 11 (FIGS. 4 and 5) contains an inner metering safety cap portion 12, an outer metering safety cap portion 13, and multi-step dispensing means 14 (for example, first step safety pressure pads 41 and 41' and second step safety offset pressure pad 42 and 42').

The inner metering safety cap portion 12 (FIGS. 3–5) comprises a sealing rim portion 21, a wall portion 22, a mouth portion 23 and a first safety metering aperture 24. On the flexible wall portion 22 interiorly and aligned with with the first step safety pressure pads 41 and 41' a pair of interior reenforcing rib segments 25 and 25' may be provided and on the interior surface of the flexible wall portion 32 and aligned with the second step safety offset pressure pads 42 and 42' a pair of reenforcing rib segments 27 and 27' may be provided (FIGS. 4, 5). Rib segments 25, 25', 27, 27', are aligned with the pressure pads 41, 41', and 42, 42'; thus each of members 25, 25' is 180 degrees apart from the other (the same is true as to the rib segments 27, 27'); a showing (FIGS. 4 and 5) of one rib segment of each pair will thus suffice for both.

The outer metering safety cap portion 13 (FIGS. 3–5) comprises a sealing rim portion 31, wall portion 32, mouth portion 33, and a second safety offset metering aperture 34.

The first step safety pressure pads 41, 41' extend (FIG. 1) along the wall portion 32 of the outer metering safety cap portion 13 in a direction perpendicular to the plane of the first safety metering aperture 24 and near the ends thereof. The second step safety offset pressure pads 42 and 42' (FIG. 2) extend perpendicular to the plane of second safety offset metering aperture 34 and near the ends thereof. By virtue of the offset relationship of these pressure pads and of the apertures associated therewith, the contents cannot be dispensed by an application of pressure at any single point on the wall of the safety or otherwise than on completion of the precise operation procedure pursuant to the invention. The only means for effectuating dispensing of the contents is by pressure applied precisely to the pressure pads in the proper sequence and by use of sufficient coordination, dexterity and strength, which, due to the construction features of the device, is beyond the ability, strength and intelligence of a child. The metering safety cap device is sealed to the container C to prevent removal of the entire cap unit, further preventing accidental or unauthorized access or dosage.

In operation (FIGS. 1 and 2) for example, the container C and the metering safety cap device 11, may be inclined or inverted so that the contents A of the container (for example, solids such as pills A in FIGS. 1 and 2, or small particles, granules or powders, FIGS. 6 and 7) will rest against the mouth portion 23 of the inner metering safety cap portion 12. Pressure is applied, in the first step of the multi-stage operation, to the first-step safety pressure pads 41, 41' (FIGS. 1, 6). The mouth portion 23 is thus compressed and (FIG. 1) the first safety metering aperture 24 is bowed and opened, permitting a metered amount of the contents to move into the chamber 36 and thus into the outer metered safety cap portion 13. In the second stage, pressure is applied to the second step safety offset pressure pads 42, 42' (which [FIG. 3] are positioned offset from the positioned offset from the position of the first step safety pressure pads 41, 41') so that the same pressure act or step will not open both mouth portions 23, 33. The mouth portion 33 is thus bowed in the second step and second safety offset metering aperture 34 opened, permitting final (FIGS. 2, 7) dispensing of the metered amount of the contents. The requirement in this invention that a multi-stage operation be carried through so as to dispense single or small measured or predetermined quantities of the contents of the container, effectively safeguards the contents of container C from the likelihood of dispensing of the contents by children and others.

The metering safety cap device of this invention may be molded or otherwise formed of flexible material, the portions 12 and 13 being cup-shaped and shown in the drawings as separate parts which may be secured together prior to positioning on the container neck and secured to the latter in turn by any suitable means; they may be made unitary if desired. The assembly of parts 12 and 13 may be positioned on the neck of the container when the latter has been filled with the products to be dispensed and sealed thereto as by application of heat and pressure or secured thereto in any other desired manner.

While the foregoing disclosure of exemplary embodiments is made in accordance with the patent statutes, it is to be understood that the invention is not to be limited thereto or thereby, the invention scope being defined in the appending claims.

The invention claimed is:

1. A metering safety cap device, for use on a container for preventing the dispensing of a non-metered portion of the contents of the container comprising:
   (a) an inner metering safety cap portion, sealed to the container, to seal the contents, comprising
      a sealing rim portion for placement about the opening of said container,
      a flexible wall portion extending from said sealing rim portion,
      a mouth portion, forming a closure with said sealing and wall portions and said container, and
      a first safety metering aperture in said mouth portion, normally in a closed position,
   (b) an outer metering safety cap portion sealed to the opening of said container and which fits about said inner metering safety cap, comprising
      a second flexible wall portion,
      a second sealing rim portion for sealing said second wall portion to said opening in said container,
      a second flexible mouth portion, and
      a second safety offset metering aperture, which is positioned offset from the positioning of said first safety metering aperture on assemblage of the entire device, so that the opening of said first safety metering aperture by pressure being applied to said wall portion would not cause said second safety offset metering aperture to open, said second safety offset metering aperture being opened only upon application of pressure at a second point, and
   (c) multi-step dispensing means provided on said cap requiring the application of pressure thereto so as to permit stepwise dispensing of sequential measured quantities of the contents of said container.

2. In a metering safety cap device as described in claim 1, said multi-step dispensing means comprising:
   first step safety pressure pads, positioned on said second flexible portion, and
   second step safety pressure pads positioned offset from said first step safety pressure pads on said second flexible wall portion such that application of pressure is required in separate stepwise stages on said second flexible wall portion.

3. In a metering safety cap device as described in claim 2, said multi-step dispensing means further comprising interior rib segments on the interior portion of said inner metering safety cap portion, extending along said interior portion of said first flexible wall portion from the ends of said first safety metering aperture, and in assemblage being positioned opposite said first step safety pressure pads of said multi-step dispensing means.

References Cited

UNITED STATES PATENTS

| 2,219,604 | 10/1940 | Trotter | 222—490 X |
| 2,298,668 | 10/1942 | Will | 222—207 |
| 3,224,650 | 12/1965 | Willits | 222—207 |
| 3,342,318 | 9/1967 | Ruekberg et al. | 222—490 X |

FOREIGN PATENTS

| 221,876 | 6/1962 | Austria. |
| 345,439 | 5/1960 | Switzerland. |

SAMUEL F. COLEMAN, Primary Examiner